Patented Oct. 18, 1949

2,485,279

UNITED STATES PATENT OFFICE 2,485,279

PREPARATION OF EXTRACTS FROM CITRUS FRUIT PEEL

Otto Isidor Giniewski, Jerusalem, Palestine, assignor of one-half to Maxime Piha, Talbieh-Jerusalem, Palestine No Drawing. Application November 4, 1946, Serial No. 707,755. In Palestine March 22, 1946

16 Claims. (Cl. 99—22)

This invention has the object to provide a process for the preparation from citrus fruit peel of an extract or juice containing the vitamins naturally occurring in the peel.

The invention also has the object to provide a process for sweetening extracts or juices obtained from citrus fruit peel and containing the vitamins naturally occurring in the peel.

The principal vitamin occurring in citrus fruit peel is vitamin C. Although this substance can also be prepared synthetically, yet, for reasons not yet fully understood, the natural vitamin surpasses the synthetic one in some of its physiological effect though probably not in its antiscurvy efficacy. This phenomenon appears to be due to the fact that natural vitamin C is accompanied by other substances of vitamin-like behavior, for example, the so-called factor P, which are absent in the synthetic vitamin.

Now it is known that vitamin C is in certain cases very rapidly destroyed by oxidation as soon as it is separated from its natural surroundings. Therefore, although much more vitamin C is contained in the peel than in the juice of citrus fruit, yet the juice extracted from the peel by usual methods is as a rule very poor in, or even altogether devoid of, vitamin C because this is lost in the process. Subsequent addition to such peel extracts of synthetic vitamin C is not fully satisfactory for the reasons set out hereinbefore.

The present invention solves the problem of preparing extracts from citrus fruit peel wherein the natural vitamin C contents are preserved virtually without loss.

According to this invention, the peel is subjected to a heat treatment prior to the extraction and/or simultaneously therewith. This appears to have the effect of inactivating the oxidase, a ferment naturally contained in citrus fruit peel. In the natural surroundings, i. e. in the cells of the peel, oxidase does not appear to act on vitamin C, probably for the reason that either the oxidase is inhibited, or the vitamin protected by other substances. Such inhibition or protection does not continue in the cell juice extracted from the cell, and the oxidase produces quick oxidation of the vitamin. This action is prevented by the heat treatment according to the invention.

Extracts obtained in accordance with the invention may be concentrated by evaporation, preferably in vacuo, whereby a honey-like highly viscous syrup with an hitherto unobtainable high vitamin content results. This syrup, in which the solids consist mainly of a mixture of glucose and fructose, has a high nutrient value even apart from its vitamin content. Moreover, the vitamin C keeps therein for a practically unlimited time, and this the better the higher the concentration of the sugars in the syrup, apparently owing to the strong reducing power of the sugars which prevents oxidation by the oxygen of the air.

Such concentrates are apt to taste somewhat bitter owing to the presence therein of certain bitter substances, presumably glucosides. The usual method of sweetening citrus peel extracts in the course of their concentration by the addition thereto of alkaline reacting agents, which apparently saponify the glucosides and destroy their bitterness, is not applicable where the natural vitamin contents are to be preserved since the said alkaline agents would destroy the vitamins. The invention, therefore, provides also a process for sweetening such vitamin-containing citrus fruit peel extracts, which process consists in principle therein that the extracts or their concentrates are extracted with an organic solvent immiscible with water. Such extraction may be repeated as many times as this appears desirable or required in each particular case for the removal of the whole or a substantial part of the bitter substances. Any traces of solvent eventually remaining in the aqueous residue may be removed therefrom by evaporation, preferably in vacuo.

Suitable solvents for the purposes of this invention are, for example, benzene, toluene, xylene, petroleum ether, benzine, chloroform and the like.

It is preferable to perform the sweetening operation not with the original peel extract but with a more or less viscous concentrate prepared therefrom by evaporation. This necessitates less solvent and facilitates the separation of the solvent from the aqueous residue while in the case of the not-concentrated peel extract being subjected to the sweetening operation, the solvent is apt to become emulsified with the aqueous liquor, and the emulsion may take a rather long time for breaking up again.

It has been ascertained that the sweetening operation according to this invention completely removes any bitter taste from the peel extracts but does not affect their vitamin contents.

The invention is illustrated by the following examples:

Example 1

380 grs. of fresh orange peel are left in contact for about one minutes with 380 cc. of boiling water and thereafter comminuted by trituration with an equal quantity of iron-free quartz sand. The water is then drained off and the peel is extracted in vacuo with water in a Soxhlet apparatus at a temperature not exceeding 35° C., the recipient of the apparatus containing initially 380 cc. of water. The extraction is continued until the solid-container of the apparatus has been emptied nine times by siphonage. Since some water is retained by the comminuted peel in the solid-container, about 200 cc. of an aqueous extract are obtained. This contains about 200 milligrams of vitamin C and 27 grs. of invert sugar.

This extract is concentrated by evaporation in vacuo at a temperature not exceeding 40° C. until the sugar content has risen to about 35% by weight, and allowed to cool. The evaporation is then interrupted, and 4 parts of volume of the concentrate are admixed at ordinary temperature with one part by volume of benzene, the mixture is vigorously stirred for ten minutes and allowed to stand thereafter for about 15 minutes. The solvent layer, which collects on top of the aqueous layer, is thereafter removed by decantation, and the aqueous residue is similarly extracted successively with another two portions of benzene. After the third extraction, the mixture is allowed to stand for several hours in order to enable a nearly complete separation of the solvent layer from the aqueous residue. After the removal of the former, the latter is further concentrated in vacuo, whereby also the last traces of benzene are eliminated. The concentration may be continued until a ratio of concentration of about 6:1 (calculated from the original peel extract) is reached. Thereby one obtains a honey-like syrup containing about 60% by weight of sugar and as much as about 5 to 6 grs. of natural vitamin C per litre.

*Example 2*

340 grs. of orange peel, cut into small pieces, are leached successively with three portions of boiling water of 200 cc., 170 cc. and 150 cc. respectively, the time of contact of the peel with the water being each time of the order of about 1 minute.

The combined extracts contain about 152 milligrams of vitamin C and 18 grs. of sugar. The extract may be concentrated and sweetened as described in Example 1.

*Example 3*

1 kg. of minced orange peel are extracted with 2 litres of boiling water which is poured on the peels and allowed to run off at once. The operation may be carried out, for example, on a sieve. The extract is admixed with 3 to 4 grs. of calcium carbonate with a view to precipitating any pectin that has dissolved, and boiled for about one minute, preferably in a vessel provided with a lid in order to exclude as far as possible the access of oxygen. The liquor is then filtered and the clear filtrate, which contains about 40 grs. of sugar and 0.5 gr. of vitamin C per litre, is concentrated in vacuo and sweetened as described in Example 1.

The water used for the extraction can be replaced by an equal quantity of citrus juice, preferably filtered. The contents of vitamin C in the concentrate rise in this case to about 0.7 gr. per litre.

*Example 4*

1 kg. of minced orange peel is exposed for one minute to a current of air heated to 100° C. and then pressed out in a hydraulic press under a pressure of about 200 kg. per cc. One obtains about 600 cc. of extract containing 0.5 milligram of vitamin C per cc., about 300 milligrams in all. The extract may be concentrated in vacuo and sweetened as described in Example 1.

The invention is, of course, not limited to the examples given hereinbefore. For instance, after having been heated like in Example 4, the peel may be leached instead of being pressed out. Instead of with hot air, the peel may be heated dry in any other suitable manner, e. g. by heat radiation or ultra-short-wave radiation. The peel may also be treated in the heat both before and during the extraction, e. g. by performing a hot-air treatment described in Example 4, followed by a hot extraction as described in Example 3.

I claim:

1. A process of preparing from citrus fruit peel a honey-like syrup containing the natural sugar and vitamins of the peel, comprising subjecting the peel to a heat treatment by warming it quickly and for a short time up to from 80° to 100° C., obtaining from the peel an aqueous liquor, and concentrating said liquor.

2. A process of preparing from citrus fruit peel a honey-like syrup containing the natural sugar and vitamins of the peel, comprising subjecting the peel to a heat treatment by warming it quickly and for a short time up to from 80° to 100° C., leaching the peel with an aqueous liquor, and concentrating the aqueous extract.

3. A process of preparing from citrus fruit peel a honey-like syrup containing the natural sugar and vitamins of the peel, comprising subjecting the peel to a heat treatment by warming it quickly and for a short time up to from 80° to 100° C., extracting it thereafter with an aqueous liquor, and concentrating the aqueous extract.

4. A process of preparing from citrus fruit peel a honey-like syrup containing the natural sugar and vitamins of the peel, comprising leaching the peel with water having a temperature of from 80° to 100° C., and concentrating the aqueous extract.

5. A process of preparing from citrus fruit peel a honey-like syrup containing the natural sugar and vitamins of the peel, comprising subjecting the peel to a dry heating treatment by warming it quickly and for a short time up to from 80° to 100° C., thereafter pressing it out, thereby obtaining an aqueous juice, and concentrating said juice.

6. A process of preparing from citrus fruit peel a honey-like syrup containing the natural sugar and vitamins of the peel, comprising subjecting the peel to a dry heating treatment by warming it quickly and for a short time up to from 80° to 100° C., thereafter leaching it with an aqueous liquor, and concentrating the aqueous extract.

7. A process of preparing from citrus fruit peel a honey-like syrup containing the natural sugar and vitamins of the peel, comprising subjecting the peel to a heat treatment by warming it quickly and for a short time up to from 80° to 100° C., leaching the peel with an aqueous liquor, separating the extract from the residue, concentrating the extract, de-bittering the concentrate by extraction with an oragnic solvent not miscible with water, and separating the solvent extract from the aqueous residue.

8. A process of preparing from citrus fruit peel a honey-like syrup containing the natural sugar and vitamins of the peel, comprising subjecting the peel to a heat treatment by warming it quickly and for a short time up to from 80° to 100° C., leaching the peel with an aqueous liquor, separating the extract from the residue, concentrating the extract, de-bittering the concentrate by extraction with an organic-solvent not miscible with water, separating the solvent extract from the aqueous residue, and further concentrating the latter.

9. A process of preparing from citrus fruit peel a honey-like syrup containing the natural sugar and vitamins of the peel, comprising subjecting the peel to a heat treatment by warming it quickly and for a short time up to about 100° C., obtaining from the peel an aqueous liquor, and concentrating said liquor.

10. A process of preparing from citrus fruit peel a honey-like syrup containing the natural sugar and vitamins of the peel, comprising subjecting the peel to a heat treatment by warming it quickly and for a short time up to about 100° C., leaching the peel with an aqueous liquor, and concentrating the aqueous extract.

11. A process of preparing from citrus fruit peel a honey-like syrup containing the natural sugar and vitamins of the peel, comprising subjecting the peel to a heat treatment by warming it quickly and for a short time up to about 100° C., extracting it thereafter with an aqueous liquor, and concentrating the aqueous extract.

12. A process of preparing from citrus fruit peel a honey-like syrup containing the natural sugar and vitamins of the peel, comprising leaching the peel quickly with water having a temperature of about 100° C., and concentrating the aqueous extract.

13. A process of preparing from citrus fruit peel a honey-like syrup containing the natural sugar and vitamins of the peel, comprising subjecting the peel to a dry heating treatment by warming it quickly and for a short time up to about 100° C., thereafter pressing it out, thereby obtaining an aqueous juice, and concentrating said juice.

14. A process of preparing from citrus fruit peel a honey-like syrup containing the natural sugar and vitamins of the peel, comprising subjecting the peel to a dry heating treatment by warming it quickly and for a short time up to about 100° C., thereafter leaching it with an aqueous liquor, and concentrating the aqueous extract.

15. A process of preparing from citrus fruit peel a honey-like syrup containing the natural sugar and vitamins of the peel, comprising subjecting the peel to a heat treatment by warming it quickly and for a short time up to about 100° C., leaching the peel with an aqueous liquor, separating the extract from the residue, concentrating the extract, de-bittering the concentrate by extraction with an oragnic solvent not miscible with water, and separating the solvent extract from the aqueous residue.

16. A process of preparing from citrus fruit peel a honey-like syrup containing the natural sugar and vitamins of the peel, comprising subjecting the peel to a heat treatment by warming it quickly and for a short time up to about 100° C., leaching the peel with an aqueous liquor, separating the extract from the residue, concentrating the extract, debittering the concentrate by extraction with an organic solvent not miscible with water, separating the solvent extract from the aqueous residue, and further concentrating the latter.

OTTO ISIDOR GINIEWSKI.

REFERENCES CITED

The following references are of record in the file of this patent:

UNITED STATES PATENTS

| Number | Name | Date |
| --- | --- | --- |
| 1,669,326 | Chalas et al. | May 8, 1928 |
| 2,086,911 | Hill | July 13, 1937 |
| 2,092,729 | Eberts | Sept. 7, 1937 |